(12) United States Patent
Yang et al.

(10) Patent No.: US 11,556,010 B1
(45) Date of Patent: Jan. 17, 2023

(54) MINI DISPLAY DEVICE

(71) Applicants: Wen-Tsun Wu, Hsinchu (TW);
Ching-Yao Yang, Hsinchu (TW);
Shu-Bin Wang, Taichung (TW)

(72) Inventors: Ching-Yao Yang, Hsinchu (TW);
Cheng-Kuang Yang, Taichung (TW);
Shu-Bin Wang, Taichung (TW);
Tzu-Yen Wang, Taichung (TW)

(73) Assignees: Wen-Tsun Wu, Hsinchu (TW);
Ching-Yao Yang, Hsinchu (TW);
Shu-Bin Wang, Taichung (TW)

( * ) Notice: Subject to any disclaimer, the term of this patent is extended or adjusted under 35 U.S.C. 154(b) by 0 days.

(21) Appl. No.: 17/711,803

(22) Filed: Apr. 1, 2022

(51) Int. Cl.
G02B 27/01 (2006.01)

(52) U.S. Cl.
CPC ..... G02B 27/0172 (2013.01); G02B 27/0176 (2013.01); G02B 27/0179 (2013.01); *G02B 2027/014* (2013.01); *G02B 2027/0138* (2013.01); *G02B 2027/0159* (2013.01)

(58) Field of Classification Search
CPC ............ G02B 27/0172; G02B 27/0176; G02B 27/0179; G02B 2027/0138; G02B 2027/014; G02B 2027/0159
See application file for complete search history.

(56) References Cited

U.S. PATENT DOCUMENTS

| | | | | |
|---|---|---|---|---|
| 2016/0195726 | A1* | 7/2016 | Fujishiro | G02B 27/0176 345/8 |
| 2021/0063744 | A1* | 3/2021 | Maric | G02B 27/0149 |
| 2021/0373592 | A1* | 12/2021 | Maric | G02B 27/0176 |

FOREIGN PATENT DOCUMENTS

| | | | | |
|---|---|---|---|---|
| CN | 103946732 A | * | 7/2014 | ......... G02B 27/0093 |
| CN | 109073901 A | * | 12/2018 | ......... G02B 27/0172 |
| CN | 107329260 B | * | 7/2021 | ............ G02B 17/08 |
| KR | 101590825 B1 | * | 2/2016 | |
| TW | 202210909 A | | 3/2022 | |
| WO | WO-2022092225 A1 | * | 5/2022 | |

* cited by examiner

*Primary Examiner* — Ricardo Osorio
(74) *Attorney, Agent, or Firm* — Muncy, Geissler, Olds & Lowe, P.C.

(57) ABSTRACT

A mini display device is provided, including: a main body, including an electronic module which includes an arithmetic processing unit, a storage unit and a power source electrically connected to the arithmetic processing unit, a mini display piece which includes at least one application software and a mini lens module which is disposed on the mini display piece, the arithmetic processing unit being communicatively connected to the storage unit and executing the at least one application software, the mini display piece being communicatively connected to the electronic module, the mini lens module including a shell which is hollow, a barrel and a lens, an end of the barrel being in communication with and end of the shell, the lens being disposed on another end of the barrel, another end of the shell facing toward the mini display piece.

10 Claims, 9 Drawing Sheets

MINI DISPLAY DEVICE

BACKGROUND OF THE INVENTION

Field of the Invention

The present invention relates to a mini display device.

Description of the Prior Art

Common wearable products on the market, such as virtual reality (VR), augmented reality (AR), extended reality (XR) products and wearable watches, can display various information, data, charts and videos to users, which can enhance and improve life and work and is very helpful for study and self-health management.

However, this kind of head-mounted product is usually bulky, and the watch worn on the hand needs to be moved to be within the visual range of the eyes. Some of conventional head-mounted products need to set a host within a limited distance range, and the display element provides only the display function. When the product is located out of the effective sensing range and effective signal transmission distance range of the host, it does not work. In addition, on the seabed, underground or in places where various communication networks (such as Wi-Fi) cannot be connected, the display cannot work to provide various required functions. In addition, most of the current near-eye display technologies and devices are mostly of built-in type and not extendable according to any of various requirements.

The present invention is, therefore, arisen to obviate or at least mitigate the above-mentioned disadvantages.

SUMMARY OF THE INVENTION

The main object of the present invention is to provide a mini display device which is writable with application programs according to different application requirements and provides immediate information and/or data for the user.

To achieve the above and other objects, a mini display device is provided, including: a main body, configured to be detachably connected to a wearable device, including an electronic module, a mini display piece and a mini lens module, the electronic module including an arithmetic processing unit, a storage unit and a power source, the storage unit including at least one application software, the arithmetic processing unit being communicatively connected to the storage unit and configured to execute the at least one application software, the power source being electrically connected to the arithmetic processing unit, the mini display piece being communicatively connected to the electronic module and configured to display an image according a signal received, the mini lens module being disposed on the mini display piece and configured to adjust the focal length of the mini display piece to an eye ball, the mini lens module including a shell which is hollow, a barrel and a lens, an end of the barrel being in communication with and end of the shell, the lens being disposed on another end of the barrel, another end of the shell facing toward the mini display piece.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 7 for a preferable embodiment of the present invention. A mini display device of the present invention includes a main body 1.

Figure 1:
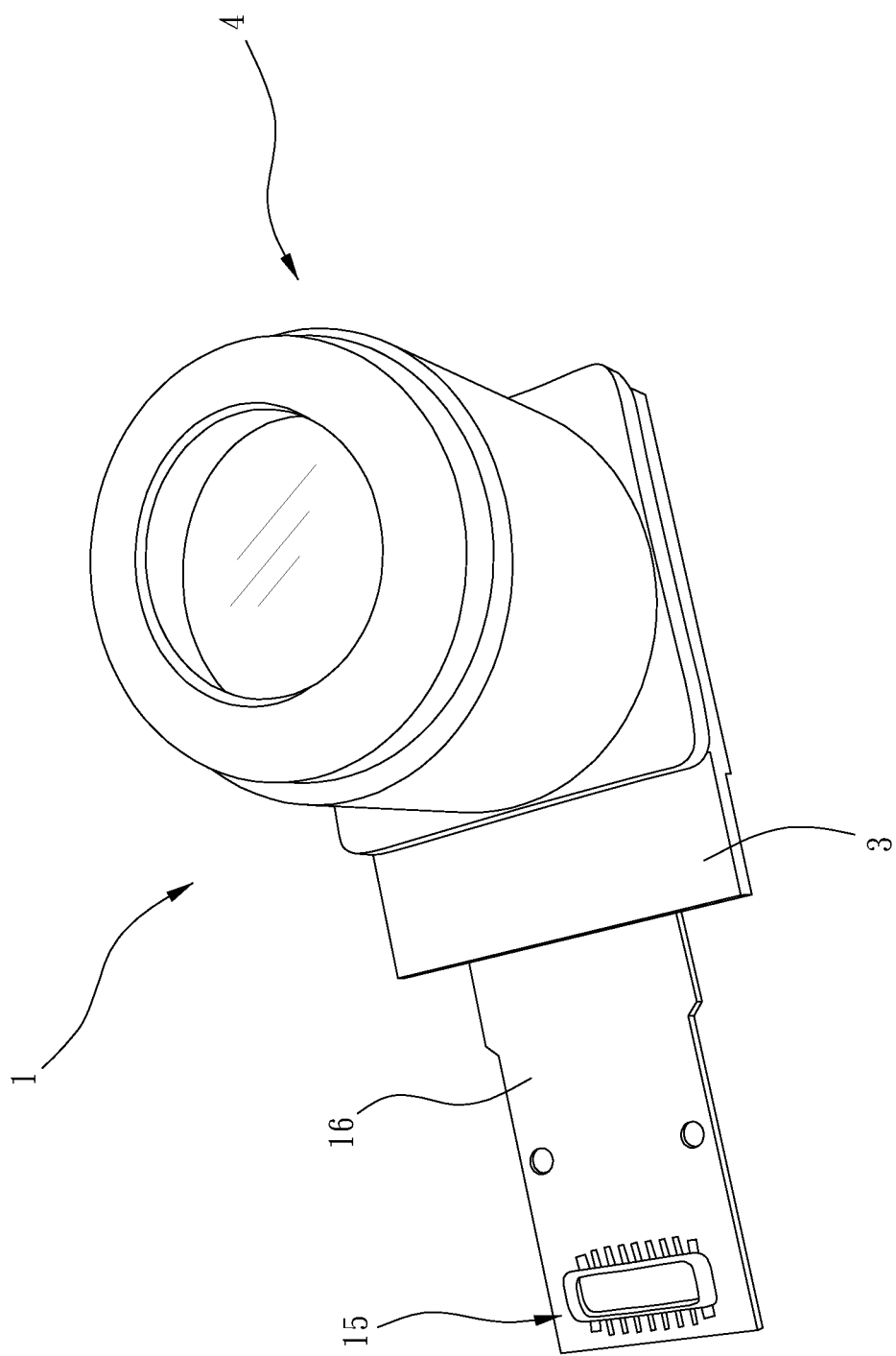
FIG. 1 is a stereogram of a main body of a preferable embodiment of the present invention.
Figure 2:
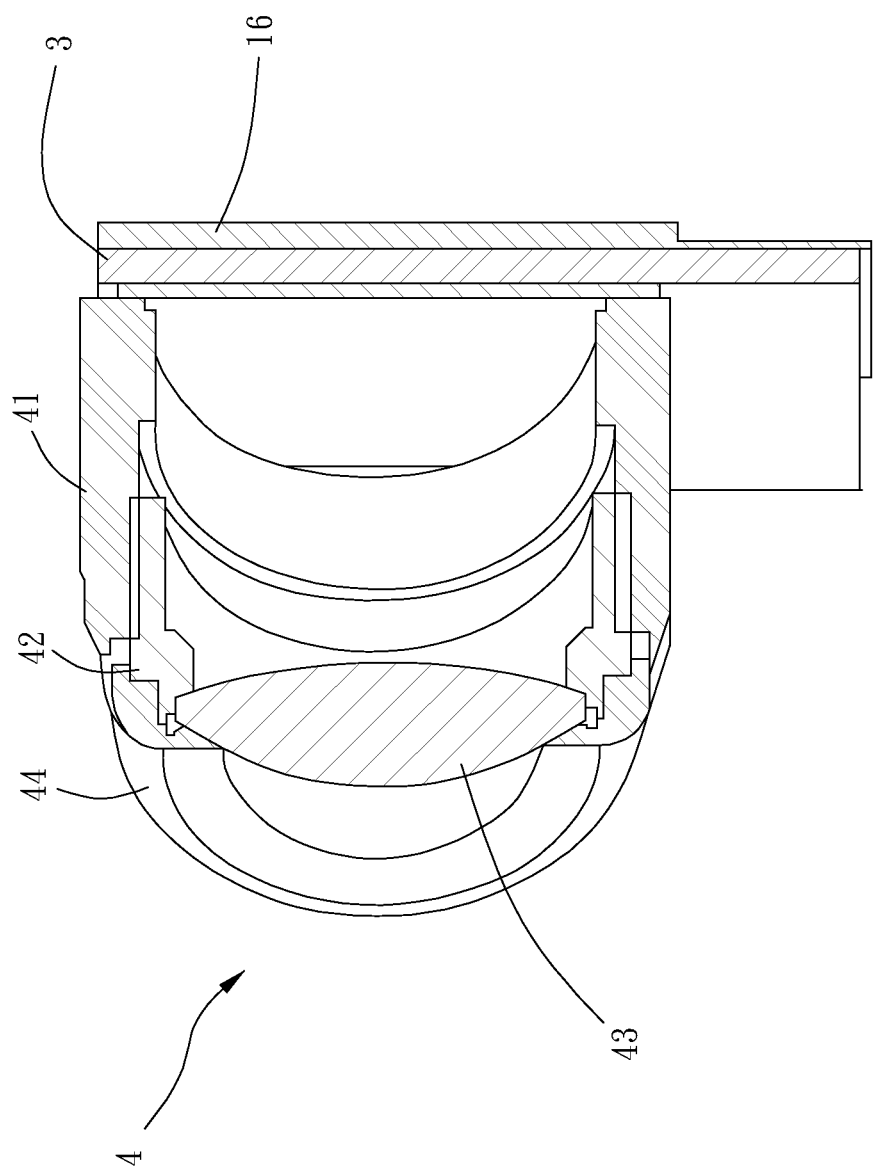
FIG. 2 is a partial cross-sectional view of FIG. 1.
Figure 3:
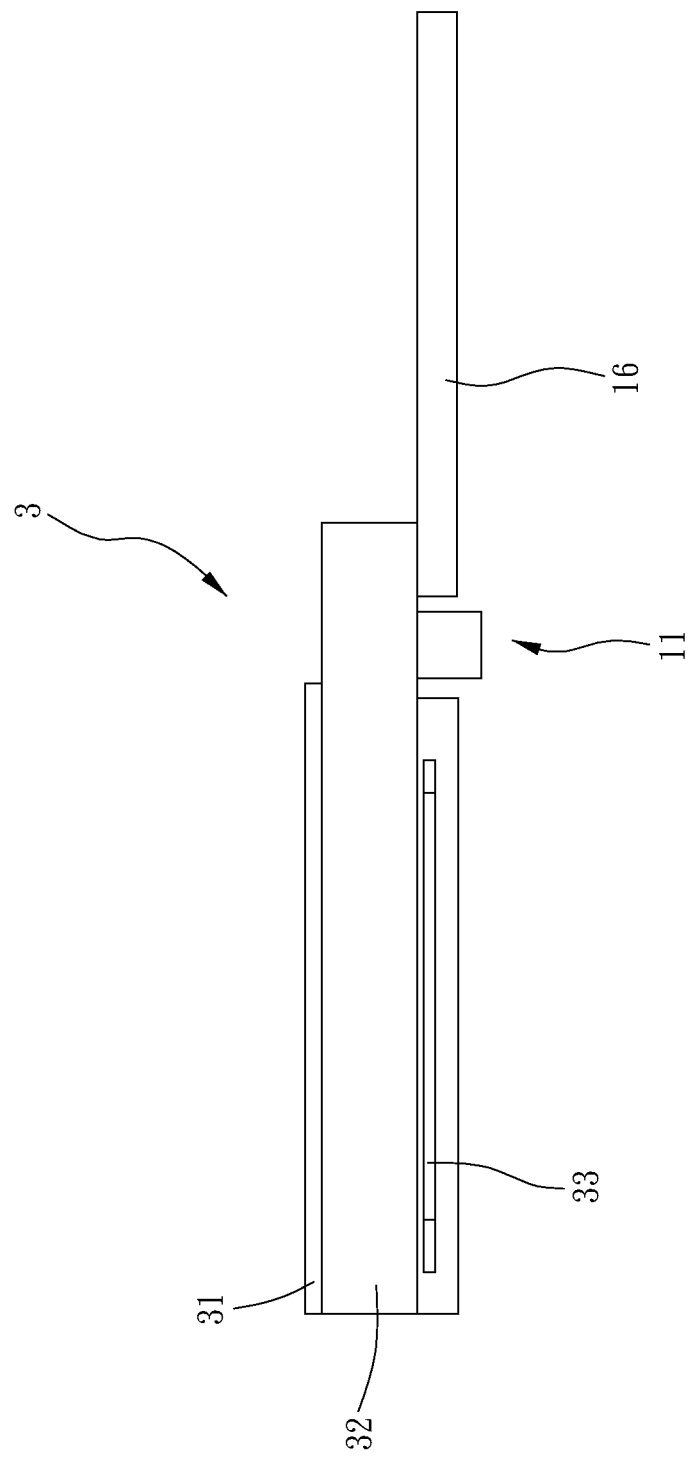
FIG. 3 is a drawing showing a mini display piece of a preferable embodiment of the present invention.
Figure 4:
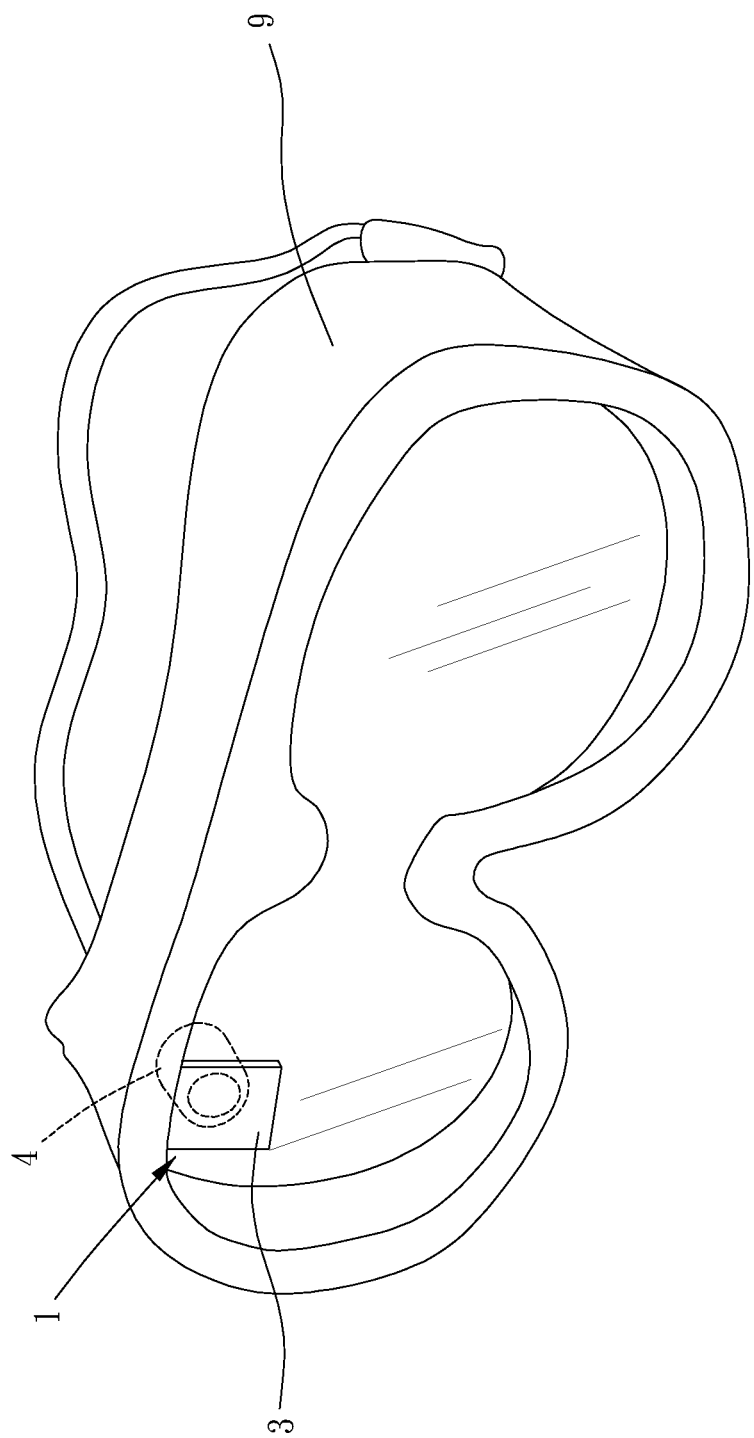
FIG. 4 is a drawing showing operation of a preferable embodiment of the present invention.
Figure 5:
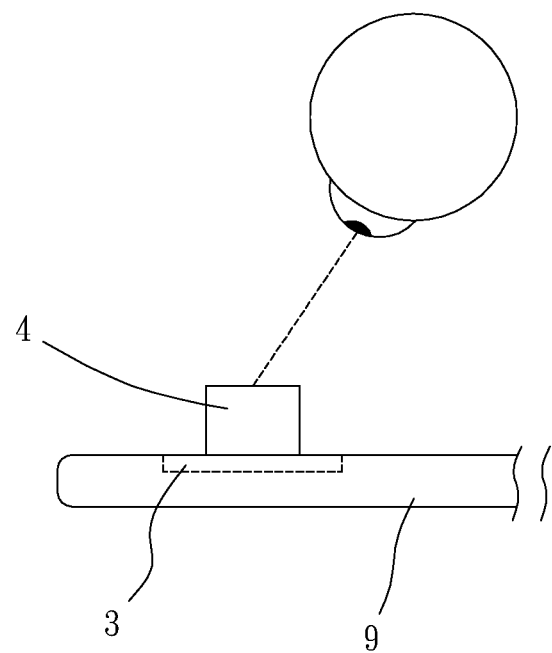
FIG. 5 is a drawing showing the mini display piece viewed by an eye according to a preferable embodiment of the present invention.
Figure 6:
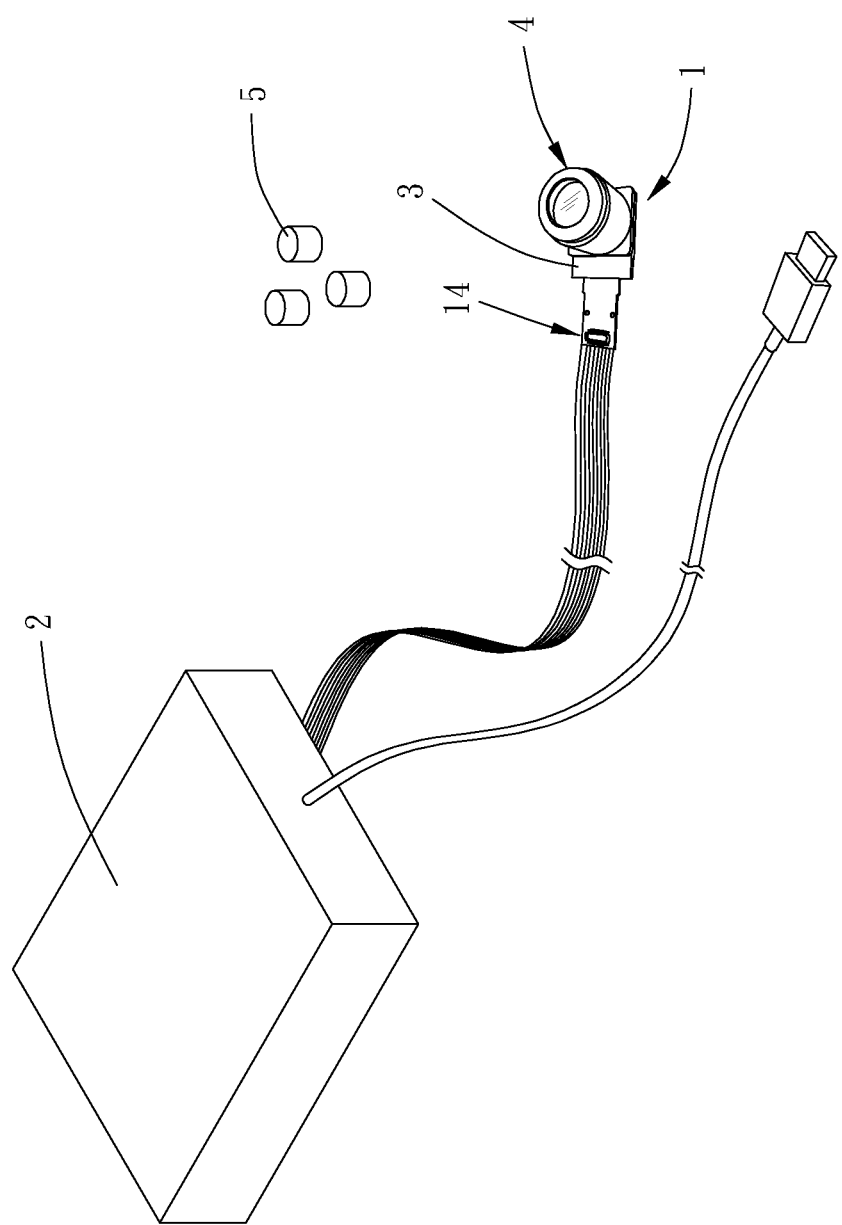
FIG. 6 is a drawing showing the main body connected with a control box according to a preferable embodiment of the present invention.
Figure 7:
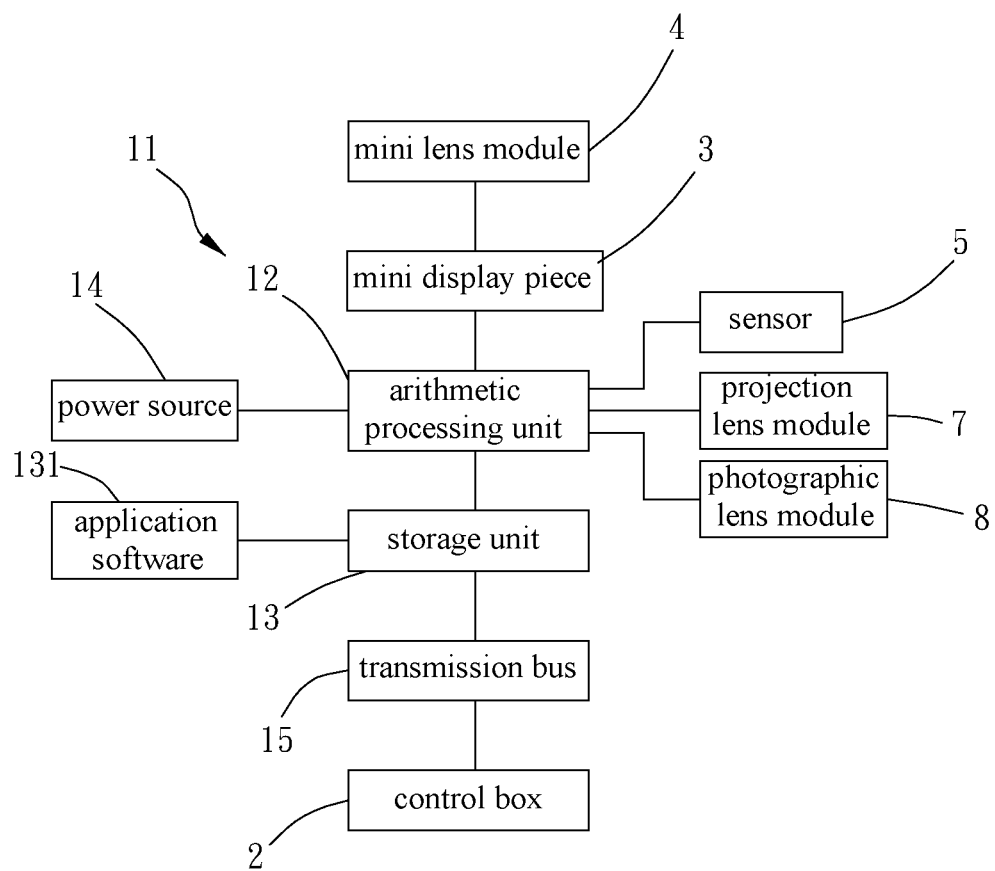
FIG. 7 is a block diagram showing the structural relationship of a preferable embodiment of the present invention.

The main body 1 is configured to be detachably connected to a wearable device 9, and the detachable design allows application to various wearable devices in fields of medical surgical goggles, military goggles, diving goggles, welding goggles, sunglasses or the like. As shown in FIG. 4, the main body 1 is embedded in the wearable device 9, wherein the main body 1 may be assembled to a pre-set mounting hole on the wearable device 9.

In other embodiments, the main body 1 may be designed to cooperate with a dedicated bracket for combination and fixation. As a result, the user can first fix the mini display device on the frame, and then assemble it in the frame, outside the frame or inside the frame, to meet the different needs of users.

Figure 8:
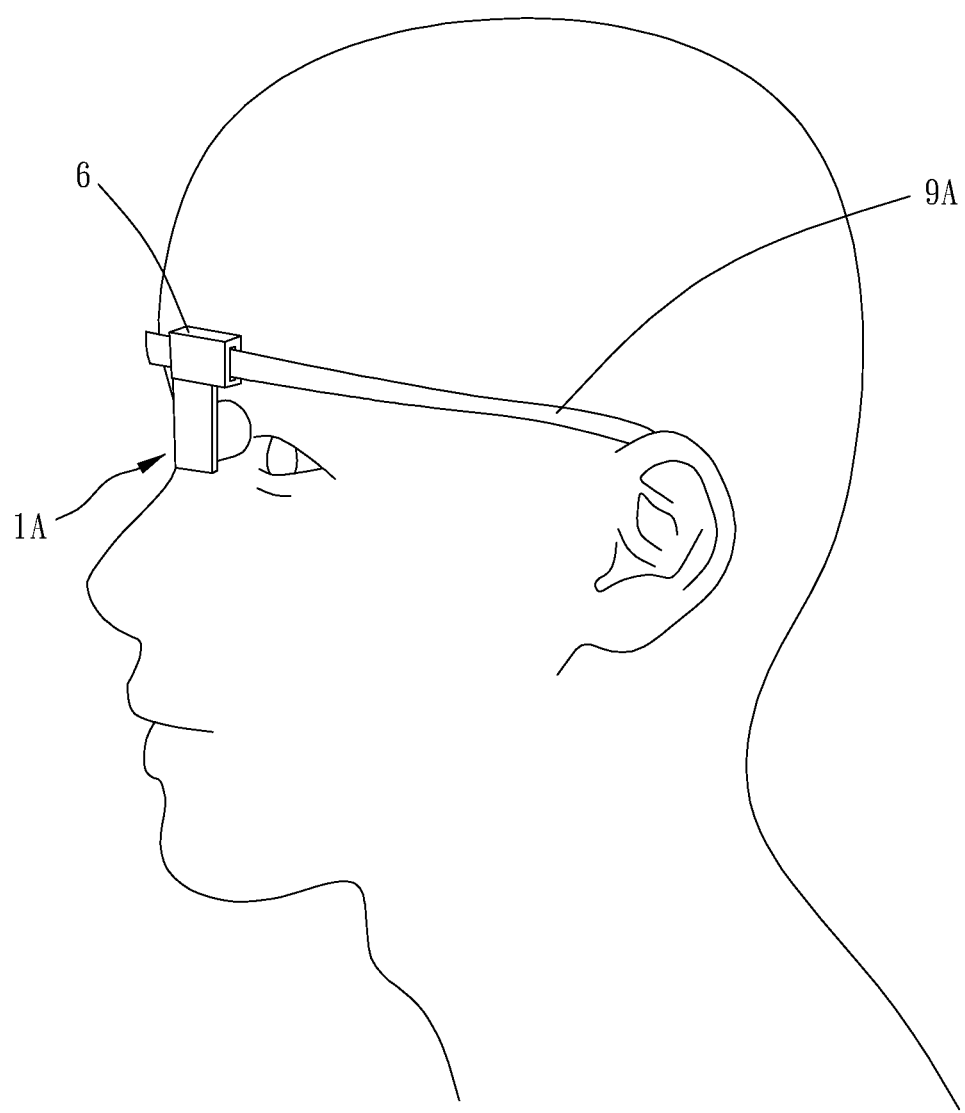
FIG. 8 is a drawing showing another use of a preferable embodiment of the present invention.

In an alternative embodiment shown in FIG. 8, as the wearable device 9A is of a head-mounted type, the mini display device preferably further includes a connection unit 6, the connection unit 6 is connected to the main body 1A, and the connection unit 6 is configured to be movably connected to the wearable device 9A, and thus it is adjustable according to various requirements. For example, the connection unit 6 is a frame, and the frame is movably disposed around the wearable device 9A.

Figure 9:
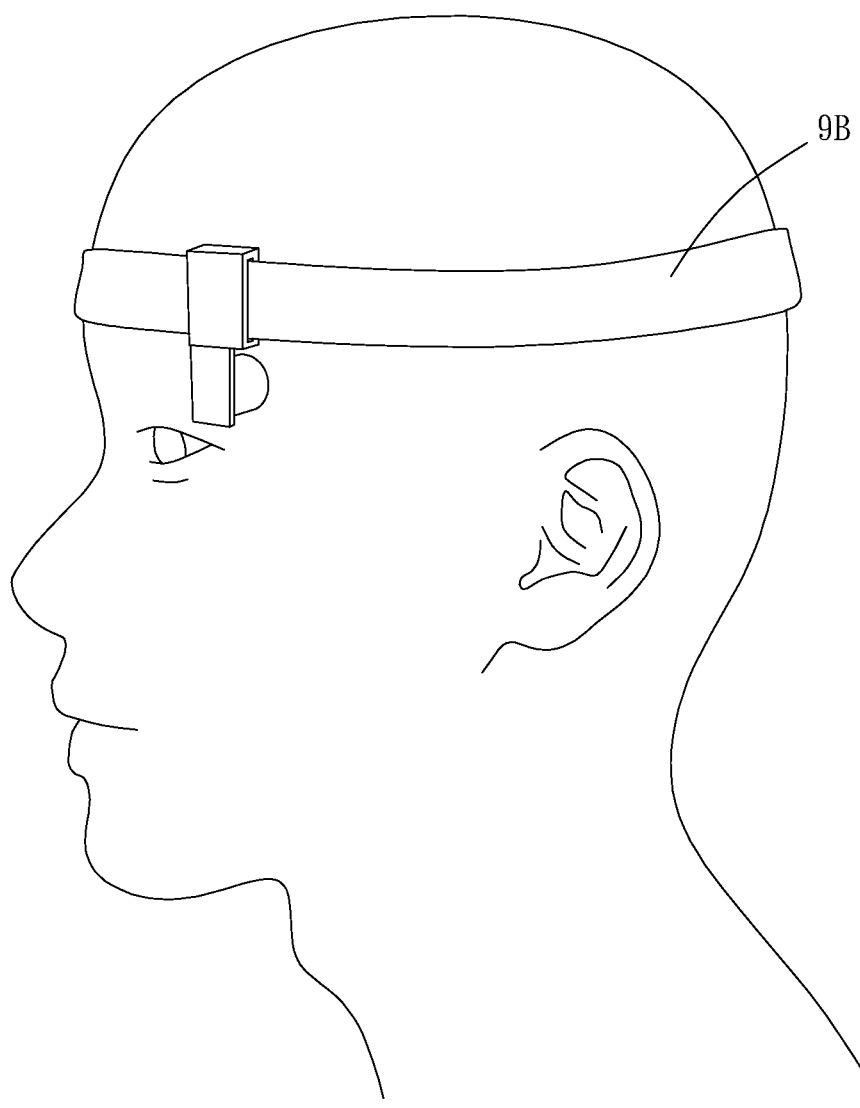
FIG. 9 is a drawing showing another use of a preferable embodiment of the present invention.

The wearable device 9A shown in FIG. 8 is configured to be worn on ears; the wearable device 9B shown in FIG. 9, the wearable device 9B is configured to be worn on the head.

Please refer to FIGS. 1 to 7, the main body 1 includes an electronic module 11, a mini display piece 3 and a mini lens module 4. The electronic module 11 includes an arithmetic processing unit 12, a storage unit 13 and a power source 14, the storage unit 13 includes at least one application software 131, the arithmetic processing unit 12 is communicatively connected to the storage unit 13 and configured to execute the at least one application software 131, and the power source 14 is electrically connected to the arithmetic processing unit 12, wherein the power source 14 may be a rechargeable lithium battery but not limited thereto. The at least one application software 131 is selected according to the desired application field, in order to provide the wearer with various information as much as possible. For example, software relevant to diving can be pre-selected during diving, and in cooperation with other components, so that it can provide during diving the water depth, water pressure, direction, map, oxygen capacity, water temperature, flow rate, etc. Since the main body 1 includes the arithmetic processing unit 12, the storage unit 13 and the at least one application software 131, the main body 1 can operate alone in environments without internet, such as undersea, underground, etc.

In this embodiment, the electronic module 11 further includes a circuit board 16, and the arithmetic processing unit 12, the storage unit 13, the power source 14 and the mini display piece 3 are disposed on the circuit board 16; the circuit board 16 is preferably a flexible circuit board but not limited thereto.

Specifically, the mini display piece 3 is communicatively connected to the electronic module 11 and configured to display an image according a signal received; the mini lens module 4 is disposed on the mini display piece 3 and configured to adjust the focal length of the mini display piece 3 to an eye ball; and the mini lens module 4 includes a shell 41 which is hollow, a barrel 42 and a lens 43, an end of the barrel 42 is in communication with and end of the shell 41, the lens 43 is disposed on another end of the barrel 42, and another end of the shell 41 faces toward the mini display piece 3.

In this embodiment, the barrel 42 is partially inserted in the shell 41, wherein the shell 41 can provide a space for travel of the light, and stabilize and protect the barrel 42 and the lens 43. The mini lens module 4 further includes a sealing member 44, and the sealing member 44 is disposed around the barrel 42 and disposed between the lens 43 and the barrel 42.

The mini lens module 4 may be expanded as needed. For example, the mini lens module 4 may include a plurality of lenses, wherein the plurality of lenses may be stacked; or, a sensor interactive lens may be included for human eye recognition, so that users can simply provide vocal or gestural commands to programmatically operate the lens.

Specifically, the mini display piece 3 is a flexible display panel, which is flexible in assembling and provides a wider visual range.

Specifically, the mini display piece 3 includes a polarizer 31, a flexible substrate 32 and a light emitting diode layer 33 which are stacked in sequence; the light emitting diode layer 33 may be a layer of LEDs, OLEDs, MINI LEDs or the like, which has a small thickness. In this embodiment, the mini display piece 3 has a thickness ranges from 0.6 mm to 1.0 mm.

Preferably, the mini display device further includes at least one sensor 5, the at least one sensor 5 is communicatively connected to the arithmetic processing unit 12, and the at least one sensor 5 is configured to detect a signal form an external environment and transmit the signal to the arithmetic processing unit. As the at least one sensor 5 is communicatively connected directly to the arithmetic processing unit 12 without any internet, the at least one application software 131 can quickly and immediately proceed to provide the wearer with environmental information such as humidity, wind speed, temperature, direction, depth, altitude, flow velocity, etc.

Preferably, the electronic module 11 further includes a transmission bus 15 communicatively connected to the storage unit 13, so that data can be input into the storage unit 13 through the transmission bus 15, or the at least one application software 131 can be replaced with another one or updated through the transmission bus 15. The mini display device may further include a control box 2 communicatively connected to the transmission bus 15, and the control box 2 is configured to be connected to at least one of a network system and a computer system, allowing updating and/or rewriting.

Preferably, the mini display device may further include at least one projection lens module 7 and at least one photographic lens module 8, and the at least one projection lens module 7 and the at least one photographic lens module 8 are disposed on the main body 1 and are communicatively connected to the arithmetic processing unit 12. An information image can be projected out through the at least one projection lens module 7 for other to view, and data and/or information can be recorded by the at least one photographic lens module 8.

In sum, application programs can be written into the mini display device according to different application requirements, and the information image is then displayed onto the eye through the mini lens module. All the scenery within the visual range is still clearly visible in the eyes, and the required application information, data, charts and videos can be read at the same time, which is very helpful for living and working environments.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A mini display device, including:
a main body, configured to be detachably connected to a wearable device, including an electronic module, a mini display piece and a mini lens module, the electronic module including an arithmetic processing unit, a storage unit and a power source, the storage unit including at least one application software, the arithmetic processing unit being communicatively connected to the storage unit and configured to execute the at least one application software, the power source being electrically connected to the arithmetic processing unit, the mini display piece being communicatively connected to the electronic module and configured to display an image according a signal received, the mini lens module being disposed on the mini display piece and configured to adjust the focal length of the mini display piece to an eye ball, the mini lens module including a shell which is hollow, a barrel and a lens, an end of the barrel being in communication with and end of the shell, the lens being disposed on another end of the barrel, another end of the shell facing toward the mini display piece.

2. The mini display device of claim 1, wherein the mini lens module further includes a sealing member, and the sealing member is disposed around the barrel and disposed between the lens and the barrel.

3. The mini display device of claim 1, wherein the electronic module further includes a transmission bus communicatively connected to the storage unit.

4. The mini display device of claim 3, wherein further includes a control box communicatively connected to the transmission bus, and the control box is configured to be connected to at least one of a network system and a computer system.

5. The mini display device of claim 1, wherein the mini display piece is a flexible display panel.

6. The mini display device of claim 5, wherein the mini display piece includes a polarizer, a flexible substrate and a light emitting diode layer which are stacked in sequence.

7. The mini display device of claim 1, wherein the mini display piece has a thickness ranges from 0.6 mm to 1.0 mm.

8. The mini display device of claim 1, further including a connection unit, wherein the connection unit is connected to the main body, and the connection unit is configured to be movably connected to the wearable device.

9. The mini display device of claim 1, further including at least one sensor, wherein the at least one sensor is communicatively connected to the arithmetic processing unit, and the at least one sensor is configured to detect a signal form an external environment and transmit the signal to the arithmetic processing unit.

10. The mini display device of claim 4, wherein the mini lens module further includes a sealing member, the sealing member is disposed around the barrel and disposed between the lens and the barrel; the mini display piece is a flexible display panel; the mini display piece includes a polarizer, a flexible substrate and a light emitting diode layer which are stacked in sequence; the mini display piece has a thickness ranges from 0.6 mm to 1.0 mm; the mini display device further includes at least one sensor and a connection unit, the at least one sensor is communicatively connected to the arithmetic processing unit, and the at least one sensor is configured to detect a signal form an external environment and transmit the signal to the arithmetic processing unit, the connection unit is connected to the main body, and the connection unit is configured to be movably connected to the wearable device; the electronic module further includes a circuit board, and the arithmetic processing unit, the storage unit, the power source and the mini display piece are disposed on the circuit board; the mini display device further includes at least one projection lens module and at least one photographic lens module, and the at least one projection lens module and the at least one photographic lens module are disposed on the main body and are communicatively connected to the arithmetic processing unit; and the barrel is partially inserted within the shell.

* * * * *